United States Patent [19]

Luft et al.

[11] Patent Number: 4,962,823

[45] Date of Patent: Oct. 16, 1990

[54] LOAD-ADJUSTING DEVICE

[75] Inventors: Jürgen Luft, Bad Soden; Eckhart Kern, Hofheim, both of Fed. Rep. of Germany

[73] Assignee: VDO Adolf Schindling AG, Frankfurt am Main, Fed. Rep. of Germany

[21] Appl. No.: 179,522

[22] Filed: Apr. 8, 1988

[30] Foreign Application Priority Data

Apr. 11, 1987 [DE] Fed. Rep. of Germany ....... 3712428

[51] Int. Cl.[5] ........................................ B60K 26/04

[52] U.S. Cl. .................................. 180/197; 123/401; 74/513

[58] Field of Search ................ 180/177, 175; 123/396, 123/400, 401, 403; 74/513; 251/54, 78, 129.03

[56] References Cited

U.S. PATENT DOCUMENTS

| | | | |
|---|---|---|---|
| 2,358,597 | 9/1944 | Russell | 74/513 |
| 2,585,814 | 2/1952 | McDonald | 74/513 |
| 3,217,827 | 11/1965 | Pickles | 123/351 X |
| 3,776,355 | 12/1973 | Scherenberg . | |
| 3,802,406 | 4/1974 | Mennesson | 74/513 X |
| 3,916,854 | 11/1975 | Barton et al. | 123/363 |
| 4,072,207 | 2/1978 | Kokubo et al. | 180/175 |
| 4,245,713 | 1/1981 | Mochida et al. | 180/176 |
| 4,401,078 | 8/1983 | Kato et al. | 123/403 X |
| 4,565,411 | 1/1986 | Seiber | 180/197 X |
| 4,703,823 | 11/1987 | Yogo et al. | 180/197 |
| 4,721,281 | 1/1988 | Kratt et al. | 123/400 X |
| 4,750,582 | 6/1988 | Maas | 180/197 |
| 4,776,420 | 10/1988 | Seibert et al. | 180/197 X |
| 4,834,044 | 5/1989 | Maas | 123/396 X |

FOREIGN PATENT DOCUMENTS

| | | | |
|---|---|---|---|
| 1081561 | 7/1980 | Canada | 180/175 |
| 0714662 | 3/1986 | European Patent Office . | |
| 2004690 | 11/1969 | France . | |
| 2004614 | 4/1979 | United Kingdom . | |
| 2089430 | 6/1982 | United Kingdom | 123/396 |
| 2193176 | 2/1988 | United Kingdom . | |

*Primary Examiner*—Charles A. Marmor
*Assistant Examiner*—Brian L. Johnson
*Attorney, Agent, or Firm*—Martin A. Farber

[57] ABSTRACT

A load-adjustment device for the internal combustion engine of an automotive vehicle has a control lever (1) which, for instance, displaces a throttle valve and is held by a coupling spring (9) against an intermediate lever (5) which can be swung directly by the accelerator pedal (3). A damping device (11) is so developed that, upon a sudden movement of the intermediate lever (5) in the direction of full load, the control lever (1) follows this movement only with a time lag action so that the automotive vehicle is not accelerated with excessive jerk.

8 Claims, 5 Drawing Sheets

LOAD-ADJUSTING DEVICE

FIELD AND BACKGROUND OF THE INVENTION

The present invention refers to a load-adjusting device having a control lever which determines the output of an internal combustion engine, and is so held by a coupling spring against an intermediate lever adapted to be moved by an accelerator pedal that the control lever follows the intermediate lever due to the force of the coupling spring.

Load-adjusting devices of this type are provided in automotive vehicles for actuating the throttle valve or injection pump by means of the accelerator pedal in order to intervene by means of an electronic control device in such a manner that, for instance, wheel spinning upon starting as a result of excessive power is avoided. The control device can see to it that, for instance, upon excessively fast depression of the accelerator pedal, the throttle valve is opened less than corresponds to the position of the accelerator pedal so that the internal combustion engine produces only a power which does not lead to a spinning of the wheels. It is also known in the case of such a load-adjusting device to intervene by means of a speed limiting controller which, due to the possibility of decoupling the control lever from the accelerator pedal, can see to it that a lower power is set than that established by the driver by means of the accelerator pedal.

Because of their expense, anti-spinning controls or speed limiting controllers are generally only installed in higher price vehicles so that the abovementioned load-adjusting device has also been used only in such cars in combination with such control devices. In the case of simpler cars the driver must still depress the accelerator pedal sufficiently slowly, in particular upon starting. Aside from the danger of the wheels spinning, if the accelerator pedal is depressed too rapidly the effect is easily obtained that the vehicle enters into an unstable jerky movement if the driver, after de pressing the accelerator pedal too strongly, releases the pedal suddenly resulting in deceleration of the vehicle as a result of which the foot of the driver instinctively moves forward and again depresses the accelerator pedal.

It is an object of the invention to develop a load-adjusting device of the aforementioned type in such a manner that spinning of the drive wheels as a result of excessively rapid depression of the accelerator pedal is avoided even without electronic control devices.

SUMMARY OF THE INVENTION

Accordingly, by the invention the control lever (1) is coupled with a damping device (11) which counteracts a sudden swinging.

By this development the result is obtained that upon a sudden depression of the accelerator pedal the control lever follows it only with a time lag. Due to this, the result can be obtained in simple fashion that the increase in output of the internal combustion engine takes place sufficiently slowly to avoid a spinning of the wheels under normal road conditions and jolting of the vehicle by repeated sudden depression and release of the accelerator pedal. Thus safety is provided against inexpert operation of the accelerator pedal, which up to now could be obtained only by expensive electronic devices.

A structurally simple but suitable embodiment of the invention is that the intermediate lever (5) is urged by a return spring (6) in the direction towards the idling position of the control lever (1), and the intermediate lever (5) is urged in the opposite direction by the coupling spring (9). The force of the return spring must be such that under all conditions rapid resetting can be effected and therefore the return member of the load-adjusting member is controlling over the entire system.

It also contributes to a simple development of the load-adjusting device if the control lever (1) and the intermediate lever (5) are each developed as a double-armed lever which can swing around a common axis (2) and if the coupling spring (9) is a tension spring which is tensioned between a lever arm (7) of the control lever (1) and a lever arm (8) of the intermediate lever (5). The axis can at the same time be the axis of the throttle shaft.

The damping device may be of very different development. It must merely be able to assure delayed movement of the control lever as compared with the accelerator pedal. A damping device which is developed in the manner of a shock absorber has proven to be particularly simple, this damping device (11) having a piston (13) which is coupled with the control lever (1) and is displaceable in a cylinder (12).

The piston can be provided with passages through which fluid present in the cylinder passes from one side of the piston to the other upon movement of the piston. A better adaptation of the damping behavior to the conditions in an automotive vehicle can, however, be obtained if, in accordance with one advantageous embodiment of the invention, the piston (13) is arranged in sealing fashion within the cylinder (12) and a pressure chamber (15) within the cylinder (12) is provided with a device (for instance a vent choke or vent throttle (21) for bleeding off pressure from the pressure chamber. By this controlled action of the pressure, one has the possibility of holding the control lever back already at the start of the depressing of the accelerator pedal, while in the case of ordinary shock absorbers the movement must first of all take place before the damping action occurs. This slight initial movement can already lead to a jerk upon the starting of a car since, for instance, when the throttle valve is closed, even slight opening angles lead to a relatively large increase in the torque of the engine.

The device for the controlled action of the pressure is of particularly simple development if it comprises a vent choke (21). Through it, upon actuation of the accelerator pedal, air can flow either out of the cylinder or into it so that the piston can be displaced slower or faster depending on the dimensioning of the vent choke.

A particularly far-reaching embodiment is one wherein the vent choke (21) is developed with a free cross section which is variable as a function of the speed of actuation of the accelerator pedal (3).

The control of such a variable throttle is particularly simple if it is effected as a function of the path.

According to a feature of the invention, the vent choke (21) is controlled as a function of the path by the position of the throttle valve.

However, the invention also can be reduced to practice by a time-dependent control of the vent choke (21).

In order to achieve a damping which differs over the path of displacement, a plurality of successively actuated vent chokes (21) can be arranged one behind the other.

As damping device there can be used a vacuumizer as customary, for instance, for door closing systems if, in accordance with one advantageous embodiment of the invention, the pressure space (15) of the cylinder (12) which faces away from the control lever (1) has a-connection to a source of vacuum (17) and, via a vent choke (21), to the atmosphere, and if a blocking device, e g a 2/2-way valve (23) which blocks the connection to the source of vacuum (17) upon actuation of the accelerator pedal (3), is provided in the connection to the source of vacuum (17).

The expense required for the control of the vacuumizer is particularly slight if the blocking device is a 2/2-way valve (23) which can be actuated by the intermediate lever (5).

The control lever can be moved in the direction of reduction in the power with only slight damping so that the output of the internal combustion engine can be reduced rapidly if the pressure chamber (15) which can be connected to a vacuum which has a connection to the atmosphere via an excess-pressure valve (22) which opens towards the atmosphere.

The vacuum necessary for the vacuumizer can be produced by means of a vacuum pump. Such pump, however, can also be dispensed with if the source of vacuum (17) is formed by the suction pipe of an internal combustion engine.

Instead of acting with vacuum on the pressure chamber which faces away from the control lever when the accelerator pedal is not actuated, one can, in kinematic reversal hereof, also arrange matters so that the pressure chamber in the cylinder (12) which faces the control lever (1) has a connection to a source of pressure and, via a excess pressure valve to the atmosphere, and that a blocking device which blocks the connection to the source of pressure upon actuation of the accelerator pedal (3) is provided in the connection to the source of pressure.

BRIEF DESCRIPTION OF THE DRAWINGS

With the above and other objects and advantages in view, the present invention will become more clearly understood in connection with the detailed description of embodiments, when considered with the accompanying drawings, of which.

DETAILED DESCRIPTION OF THE PREFERRED EMBODIMENT

Figure 1:
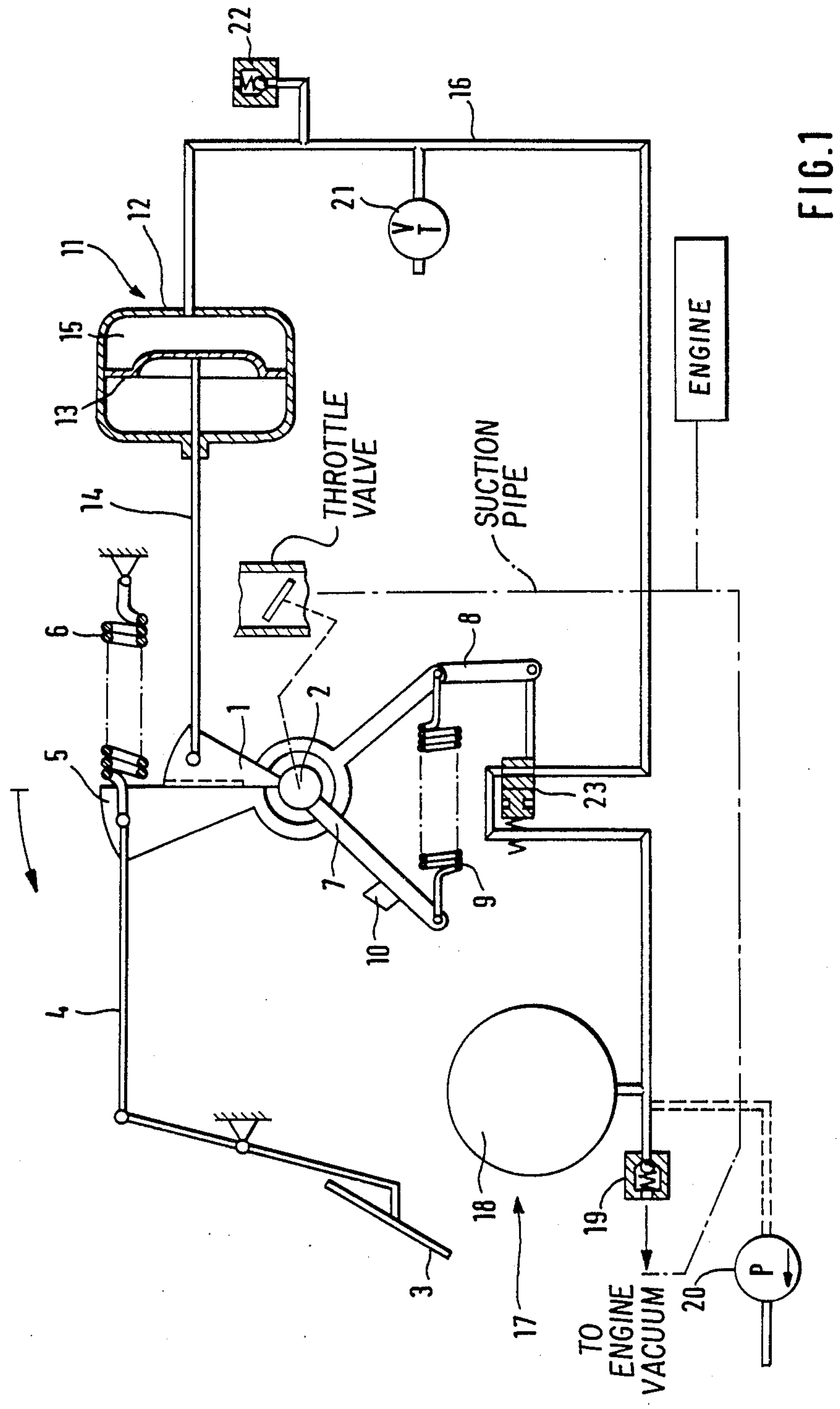
FIG. 1 shows the load-adjusting device of the invention in the idling position.

FIG. 1 shows a control lever which is arranged for swinging around a shaft 2 which, in a manner indicated in the drawing, bears, for instance, a throttle valve of an internal combustion engine. An accelerator pedal 3 is connected by means of a coupling device 4, which, for instance, can be a Bowden cable, to an intermediate lever 5 which is urged by a restoring spring 6 into the idling position shown. In this idling position, the intermediate lever 5 rests against the control lever 1. Both the intermediate lever 5 and the control lever 1 are developed as two-armed levers, and each of them has a downward directed lever arm 7, 8 between the two of which a coupling spring 9, developed as tension spring, is tensioned. This spring places the control lever 1 under tension with respect to the intermediate lever 5 so that the control lever 1 has a tendency to follow a swinging of the intermediate lever 5 in counterclockwise direCtion and thus in the direction towards full load. The lever arm 7 of the control lever 1 rests, in the idling position shown, against a stop 10 by which the idling position is defined.

A damping device 11 by which the swinging motion of the control lever 1 in counterclockwise direction is damped is of importance for the invention. In the embodiment shown, the damping device 11 consists of a cylinder 12 and a piston 13 which is displaceable in sealed manner within said cylinder and is connected by a piston rod 14 to the control lever 1. In order to produce the damping, a pressure chamber 15 in the cylinder 12 which faces away from the control lever 1 is connected via a conduit 16 to a source of vacuum 17, which may be a vacuum container 18 which can be connected, via a non-return valve 19 which blocks off from the pressure chamber 15, to the suction port (not shown) of the internal combustion engine. Alternatively, a vacuum pump 20, shown in dashed line, can, of course, also be provided.

In the conduit 16 there is arranged a 2/2-way valve 23 which can be actuated by the lever arm 8 of the intermediate lever 5 and, in the idling position, keeps the connection of the pressure chamber 15 to the source of vacuum 17 open but on the depression of the accelerator pedal 3, and thus upon a swinging of the intermediate lever 5 in counter- clockwise direction, blocks said connection.

There is also of importance for the invention a vent choke 21 which is connected in the conduit 16 and which can be developed in various manners, but in any event serves to allow air to flow into the conduit 16 after a depressing of the accelerator pedal 3.

Aside from the vent choke 21 there is arranged in the conduit 16 an excess-pressure valve 22 which opens towards the atmosphere when excess pressure is present in the conduit 16.

Figure 2:
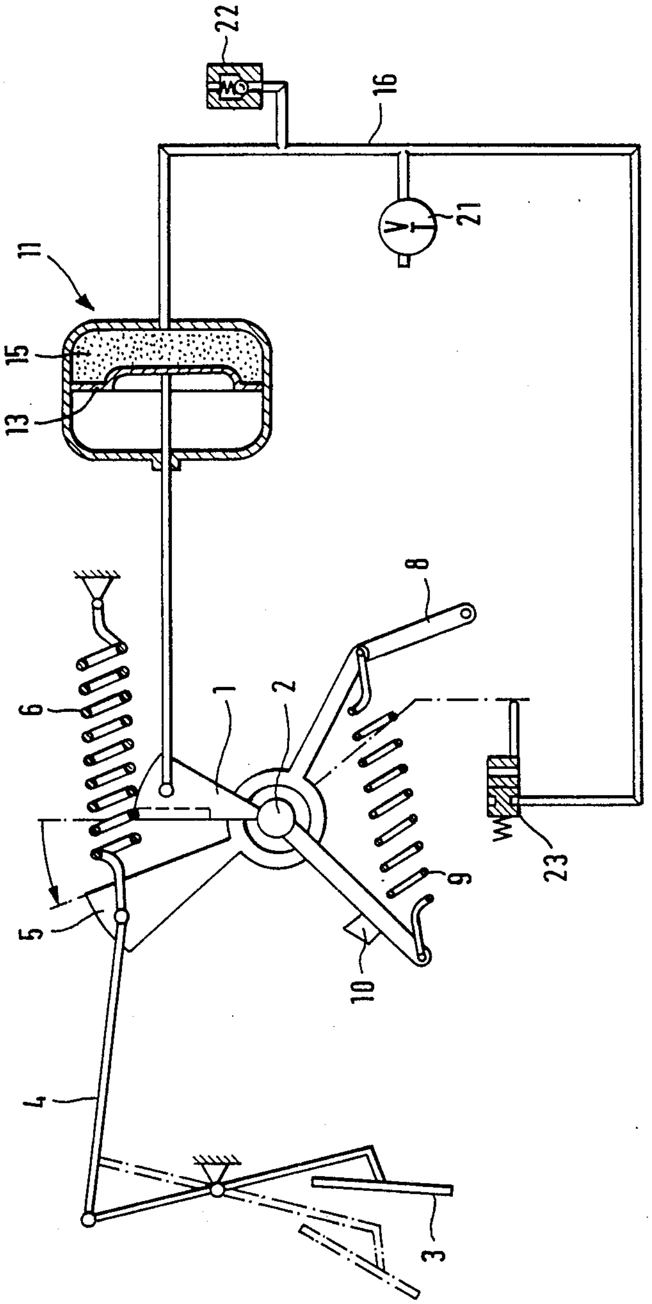
FIG. 2 shows the load-adjusting device of FIG. 1 in full-load position.

FIG. 2 shows the load-adjusting device in the position which is obtained immediately after the accelerator pedal 3 is suddenly pushed down to the full-load position. The intermediate lever 5 has, in this case, turned in counter-clockwise direction against the force of the restoring spring 6 so that its lever arm 8 has additionally tensioned the coupling spring 9. Since, in the idling position shown in FIG. 1, the pressure chamber 15 of the damping device 11 was connected via the 2/2-way valve 23 to the source of vacuum 17, the piston 13 initially holds the control lever 1 back and prevents it from following along in the swinging movement of the intermediate lever 5. By the swinging movement of the lever arm 8 of the intermediate lever 5, the 2/2-way valve 23 is, however, released so that it automatically passes into the blocking position, as shown in FIG. 2. In this way, the air which constantly flows via the vent choke 21 into the conduit 16 and thus the pressure chamber 15, leads to an equalization of pressure, which makes it possible for the control lever 1 slowly to follow the intermediate lever 5.

If the accelerator pedal 3 is suddenly released, then the intermediate lever 5 pushes the control lever 1 back into the idling position. The pressure which is built up thereby in the pressure chamber 15 can rapidly discharge through the excess pressure valve 22 towards the atmosphere so that this return movement is not damped, or only insignificantly damped.

Figure 3:
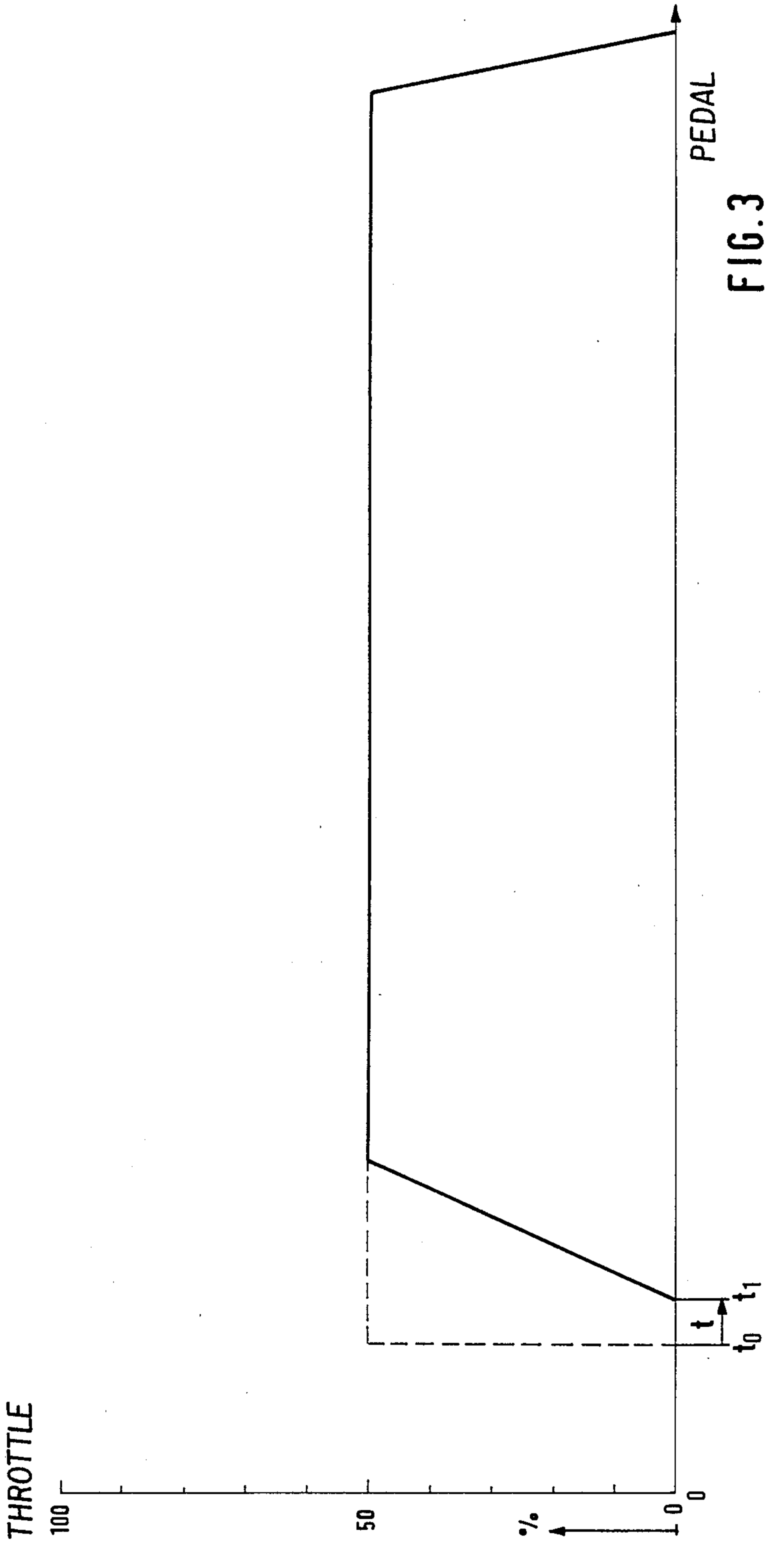
FIG. 3 shows the variation of the angle of set of a throttle valve upon a sudden displacement of the load-adjusting device from idling to 50% open.

For further clarification of the course of operation of the load-adjusting device described, the angle of set of the throttle valve is plotted with respect to time in FIG. 3. The dash line shows that at the time $t_0$ the accelerator pedal is suddenly moved from the idling position into a middle position. Due to the vacuum in the pressure chamber 15 the action of the force of which on the piston 13 and the piston rod 14 is greater than the force of the coupling spring 9, the control lever 1 initially does not follow along in the movement of the intermediate lever 5, so that the angle of set of the throttle valve is not changed until the time $t_1$.

Only when the force acting on the piston 13 has dropped to such an extent by the additional flow of air over the vent choke 21 into the pressure chamber 15 that the force is less than the force of the coupling spring 9 can the control lever 1 follow the intermediate lever 5 and the solid-line course of the change in the angle of set then take place.

If the accelerator pedal 3 is suddenly released, then the air discharges through the excess pressure valve 22 so that the control lever 1 can be pushed back rapidly by the intermediate lever 5 into its idling position, which is also shown by the solid line in FIG. 3.

Figure 4:
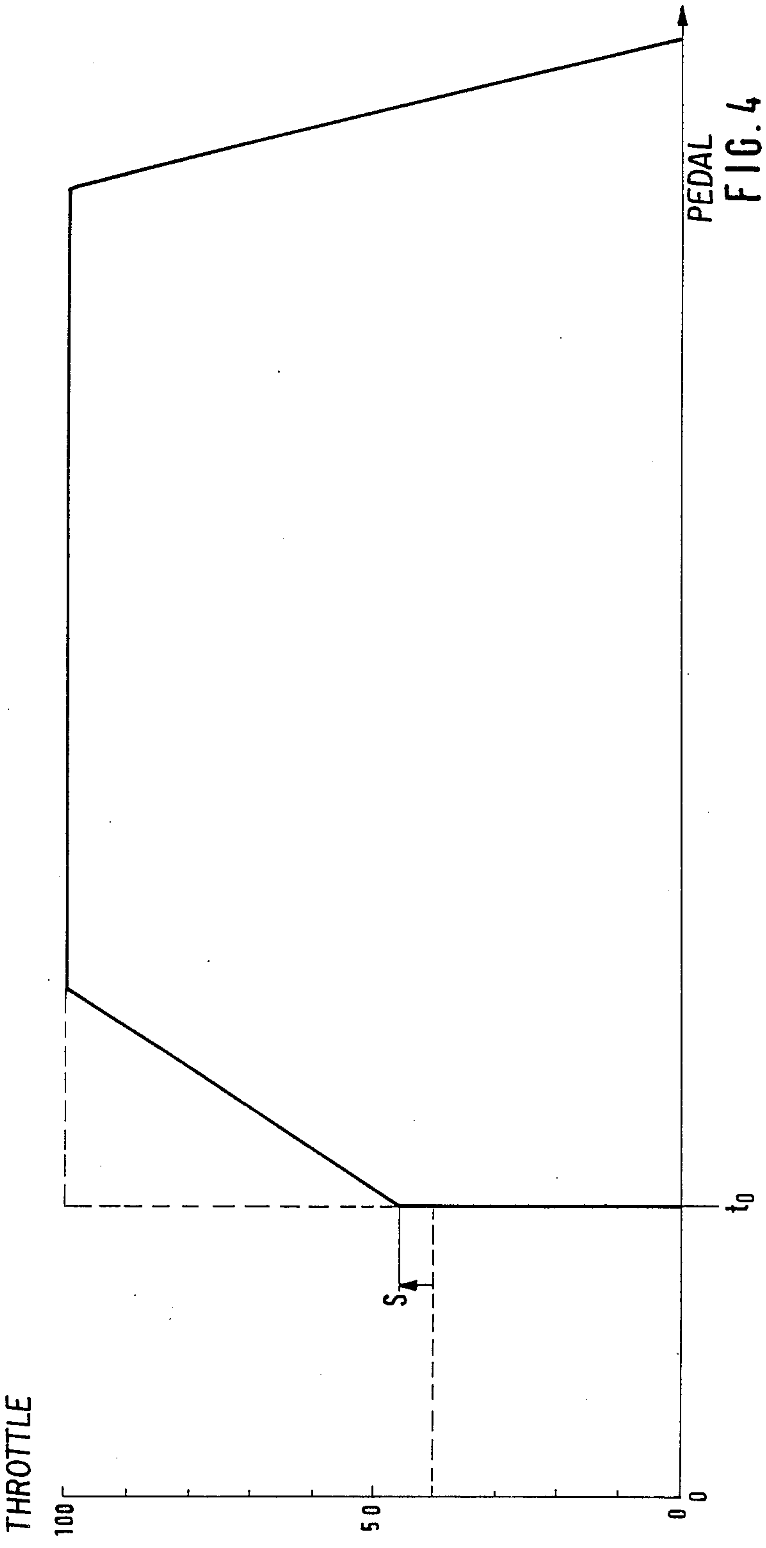
FIG. 4 shows the variation of the angle of set of a throttle valve upon a sudden displacement of the load-adjusting device from 40% to full load.

The graph of FIG. 4 shows the change in angle of set upon a sudden change from 40% throttle valve opening to full load. During this condition of travel, the pressure in the pressure chamber 15 is equal to the atmospheric pressure. However, a vacuum is produced in the pressure chamber 15 if the control lever 1 attempts to follow the rapidly swinging intermediate lever 5. The graph of FIG. 4 shows that the control lever 1 can initially swing up to an angular amount S before damping takes place, since first of all the vacuum in the pressure chamber 15 must build up. After this there is a retarded increase in the angle of set of the throttle valve caused by the inflow of the air.

Figure 5:
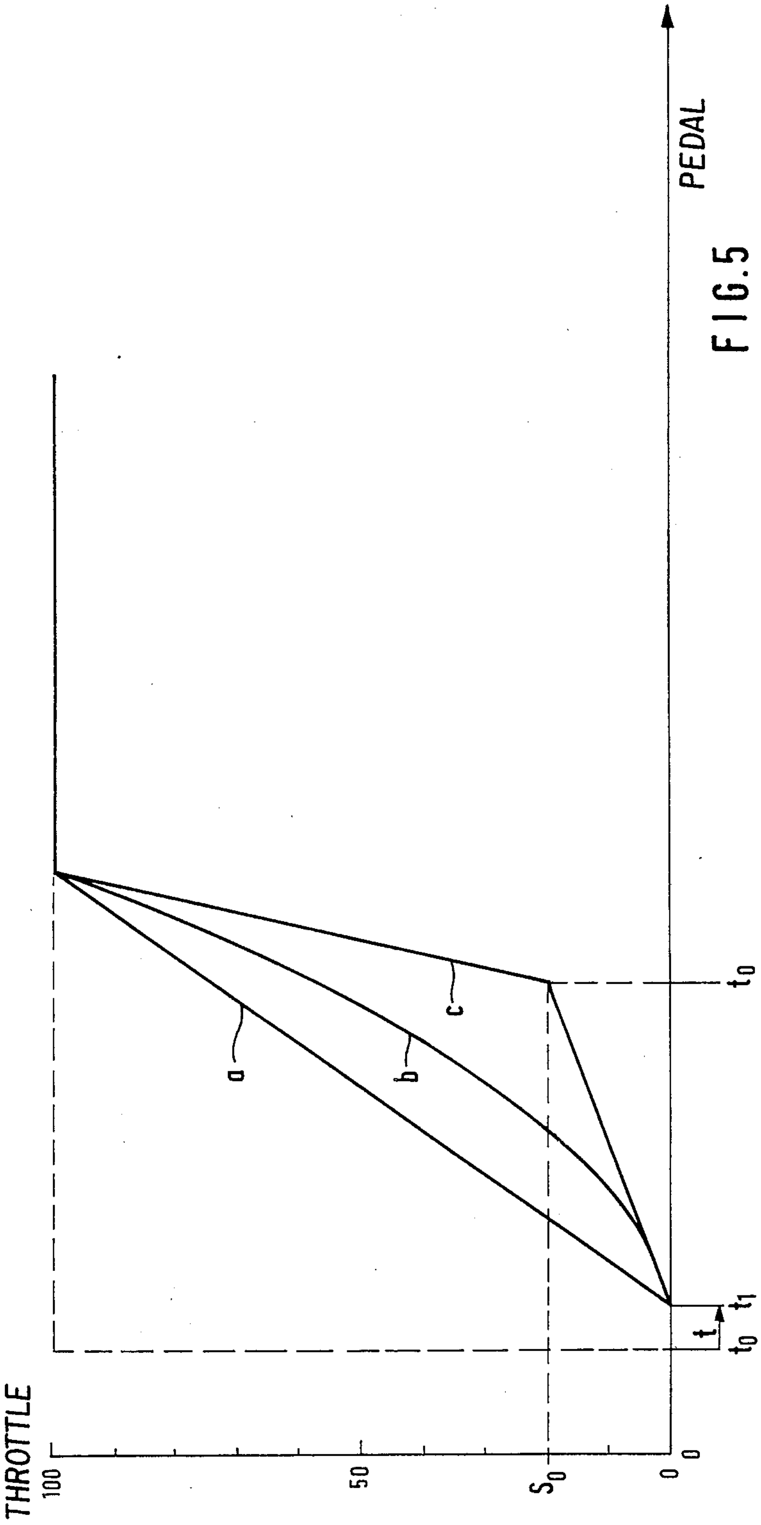
FIG. 5 shows different variations of the angle of set of a throttle valve upon a sudden displacement of different load-adjusting devices upon a sudden change from idling to full load.

The graph of FIG. 5 shows, for different load-adjustment devices, the change in angle of set with time upon a sudden depression of the accelerator pedal 3 from the idling position into the full load position. Curve a applies to the load-adjusting device shown. Curve b can be reached if the pressure chamber is aerated in controlled manner via a solenoid valve. Curve c is obtained if either at the time $t_0$ or with an angle of set $S_0$ a second vent throttle is connected.

The drawings do not show an embodiment in which the pressure chamber of the cylinder 12 facing the control lever is connected in idling position to a source of excess pressure. This connection is interrupted upon actuation of the accelerator pedal. A vent choke can then see to it that the pressure is slowly reduced so that a function corresponding to the embodiment described is obtained.

We claim:

1. In a load-adjusting system having a control lever which determines the output of an internal combustion engine in response to movement of an accelerator pedal, the system including an intermediate lever and a coupling spring, the control lever being held by the coupling spring against the intermediate lever, the intermediate lever being driven by the accelerator pedal, the control lever being urged by said intermediate lever and said coupling spring to follow a movement of the intermediate lever due to the force of the coupling spring; the improvement wherein the system further comprises:

a damping device coupled to the control lever to counteract a sudden movement of the control lever; and wherein the damping device comprises a cylinder, and a piston which is coupled with the control lever, the piston being supported in the cylinder for movement therein;

there is a pressure chamber within the cylinder, and the piston is disposed in sealing fashion within the cylinder and forms a wall of the pressure chamber; and the system further comprises vent choke means for bleeding off pressure from said pressure chamber;

an excess pressure means communicating with the atmosphere, a connection from the cylinder to a source of vacuum and to the vent choke means, and a blocking device operatively coupled via the intermediate lever to the accelerator pedal for inhibiting a communication of vacuum via the connection from the source of vacuum upon actuation of the accelerator pedal.

2. A system according to claim 1, further comprising a return spring; and wherein the intermediate lever is urged by the return spring in a first direction towards an idling position of the control lever, and the intermediate lever is urged in a second direction opposite said first direction by the coupling spring.

3. A system according to claim 2, wherein the control lever and the intermediate lever are each developed as a double-armed lever, and are disposed on a common axis for swinging about the common axis; and the coupling spring is a tension spring which is tensioned between a lever arm of the control lever and a lever arm of the intermediate lever.

4. A system according to claim 1, wherein said excess pressure means comprises a valve.

5. A system according to claim 1, further comprising means for connecting the pressure chamber to a source of vacuum; and wherein said excess pressure means connects said pressure chamber to the atmosphere and includes an excess-pressure valve which opens towards the atmosphere.

6. A system according to claim 5, wherein the source of vacuum is formed by a suction pipe of the internal combustion engine.

7. In a load-adjusting system having a control lever which determines the output of an internal combustion engine in response to movement of an accelerator pedal, the system including an intermediate lever and a coupling spring, the control lever being held by the coupling spring against the intermediate lever, the intermediate lever being driven by the accelerator pedal, the control lever being urged by said intermediate lever and said coupling spring to follow a movement of the intermediate lever due to the force of the coupling spring; the improvement wherein the system further comprises:

a damping device coupled to the control lever to counteract a sudden movement of the control lever; and wherein the damping device comprises a cylinder, and a piston which is coupled with the control lever, the piston being supported in the cylinder for movement therein;

there is a pressure chamber within the cylinder, and the piston is disposed in sealing fashion within the cylinder and forms a wall of the pressure chamber; and the system further comprises vent choke means for bleeding off pressure from said pressure chamber;

the cylinder has a pressure space which faces away from the control lever, the system including an excess pressure means communicating with the atmosphere, a connection from the pressure space of the cylinder to a source of vacuum and to the vent choke means, and a blocking device operatively coupled via the intermediate lever to the accelerator pedal for inhibiting a communication of vacuum via the connection from the source of vacuum upon actuation of the accelerator pedal.

8. A system according to claim 7, wherein the blocking device is a 2/2-way valve actuatable by the intermediate lever.

* * * * *